United States Patent [19]
Tanaka et al.

[11] Patent Number: 5,153,052
[45] Date of Patent: Oct. 6, 1992

[54] DOUBLE-SHOT MOLDED RESIN ARTICLE

[75] Inventors: Toshie Tanaka, Ikeda; Akiro Nakagawa; Haruhiko Watari, both of Tokyo; Yasuhiko Ikeda, Toyonaka, all of Japan

[73] Assignee: Nifco, Inc., Yokohama, Japan

[21] Appl. No.: 683,528

[22] Filed: Apr. 9, 1991

Related U.S. Application Data

[63] Continuation of Ser. No. 274,890, Nov. 22, 1988, abandoned.

[30] Foreign Application Priority Data

Nov. 27, 1987 [JP] Japan ................................. 62-297710

[51] Int. Cl.$^5$ .......................... B32B 7/02; F16M 13/00
[52] U.S. Cl. ................................. 428/212; 428/119; 428/120; 428/133; 428/134; 428/137; 428/138; 428/161; 428/172; 264/248; 264/328.8; 248/188; 248/188.8; 248/599; 248/615; 248/634; 248/673; 248/677; 248/678; 5/310; 108/156
[58] Field of Search ............... 248/599, 600, 601, 615, 248/634, 673, 677, 678, 444, 163.1, 188, 188.1, 188.8; 264/209.1, 328.7, 328.8, 248; 428/36.8, 99, 101, 119, 120, 134, 137, 141, 147, 156, 161, 174, 167, 172, 178, 192, 212, 542.8, 132, 133, 138, 103; 5/310; 108/156

[56] References Cited

U.S. PATENT DOCUMENTS

| | | | |
|---|---|---|---|
| 2,663,910 | 12/1953 | Danielson et al. | 264/328.8 |
| 4,042,199 | 8/1977 | Winkler | 248/188.8 |
| 4,115,506 | 9/1978 | Shima | 264/328.8 |
| 4,198,457 | 4/1980 | Saito et al. | 428/161 |
| 4,784,817 | 11/1988 | Towns et al. | 264/328.7 |
| 4,846,428 | 7/1989 | Johannes | 248/188.8 |
| 4,885,121 | 12/1989 | Patel | 264/328.8 |

FOREIGN PATENT DOCUMENTS 58-154657 4/1983 Japan .
59-28350 9/1984 Japan .

Primary Examiner—Ellis P. Robinson
Assistant Examiner—Donald J. Loney
Attorney, Agent, or Firm—Schwartz & Weinrieb

[57] ABSTRACT

A double-shot molded resin article comprises a primary molding part and a secondary molding part. The secondary molding part is molded from a thermoplastic resin having a melting point higher than the melting point of the primary molding thermoplastic resin. The primary molding part has a plurality of raised portions formed upon its surface so as to be fusion bonded to the secondary molding part. These raised portions are fused by means of the secondary molten resin at the time of the secondary molding process, whereby the primary and secondary molding parts are fusion-bonded to each other.

13 Claims, 4 Drawing Sheets

DOUBLE-SHOT MOLDED RESIN ARTICLE

This application is a continuation of application Ser. No. 274,890, filed Nov. 22, 1988, now abandoned.

FIELD OF THE INVENTION

This invention relates to a double-shot molded resin article, such as, for example, a leg of an appliance, obtained by means of a double-shot molding process of two different resins.

DESCRIPTION OF THE PRIOR ART STATEMENT

Japanese Utility Model Disclosure SHO 58-154657 and Japanese Utility Model Disclosure SHO 59-28350 disclose plastic legs of the above type, comprising a primary molding part consisting of a hard resin and mounted upon the underside of an appliance and a secondary molding part consisting of a soft resin and projecting downwardly from the underside of the primary molding part so as to be in contact with a support surface.

The bottom of the primary molding part has a downwardly open annular recess, the bottom wall of which is formed with a vertically penetrating through hole. The annular recess is filled with a soft resin, and at this time part of the resin proceeds through means of the through hole to the opposite side of the bottom wall. In this way, the secondary molding part is formed such that it sandwiches the bottom wall of the primary molding part by means of an upper and lower portion of the secondary part, thus obtaining the coupling together of the two molding parts.

With the prior art double molding process as described for fabricating a plastic leg, for instance, since the article produced has a sandwich structure, the dies used, particularly the die for the secondary molding part, are complicated in structure, thus leading to high costs of manufacture of the dies. In addition, the number of molding articles obtainable in one operation cycle is limited, leading to high molding costs.

Furthermore, since the resin proceeds through means of the through hole of the primary molding part to the opposite side of the bottom wall of the primary molding part, sink mark is formed upon the outer surface of the secondary molding part, thereby spoiling the appearance of the molded article.

OBJECT OF THE INVENTION

An object of the present invention is to provide a double-shot molded resin article such as, for example, a plastic leg, which can be fabricated with by means of dies having simple structures and which can be fabricated in a large number in one operation cycle so as to permit reduction of the cost of manufacture.

SUMMARY OF THE INVENTION

In order to attain the above object of the invention, there is provided a double-shot molded resin article, which comprises a primary molding part molded by means of a primary molding process first from a thermoplastic resin and a secondary molding part molded by means of a secondary molding process upon the primary molding part from a different thermoplastic resin, the secondary molding thermoplastic resin having a melting point which is higher than that of the primary molding thermoplastic resin, the primary molding part having a raised portion constituting a junction surface with the secondary molding part and which is fused therewith when the secondary molding part is formed.

According to the invention, at the time secondary molding process, the raised portion formed by means of the primary molding is fused by the heat of the resin of the secondary molding so as to obtain the fusion bonding thereof. Thus, a double-shot, molded resin article can be readily obtained without the need of complicated dies or special operations for the formation of the secondary molding part.

BRIEF DESCRIPTION OF THE DRAWINGS

The above and other objects and features of the invention will become more apparent from the following detailed description with reference to the accompanying drawings, in which like reference characters have been used to designate like or corresponding parts throughout the several views, and wherein.

DETAILED DESCRIPTION OF THE PREFERRED EMBODIMENTS

Figure 1:
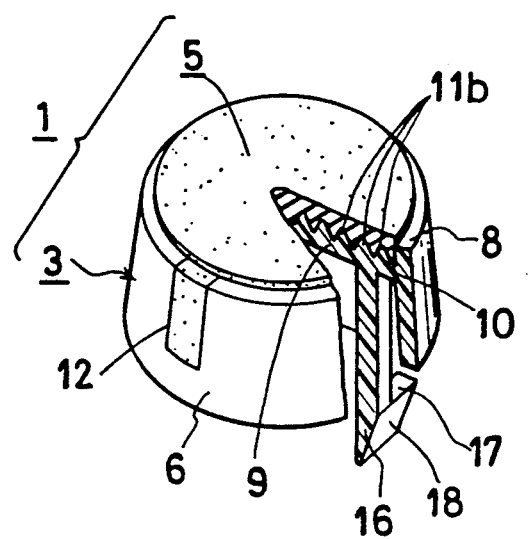
FIG. 1 is a perspective view, partly broken away, showing a plastic leg as a double-shot molded resin article constructed according to the present invention.
Figure 2:
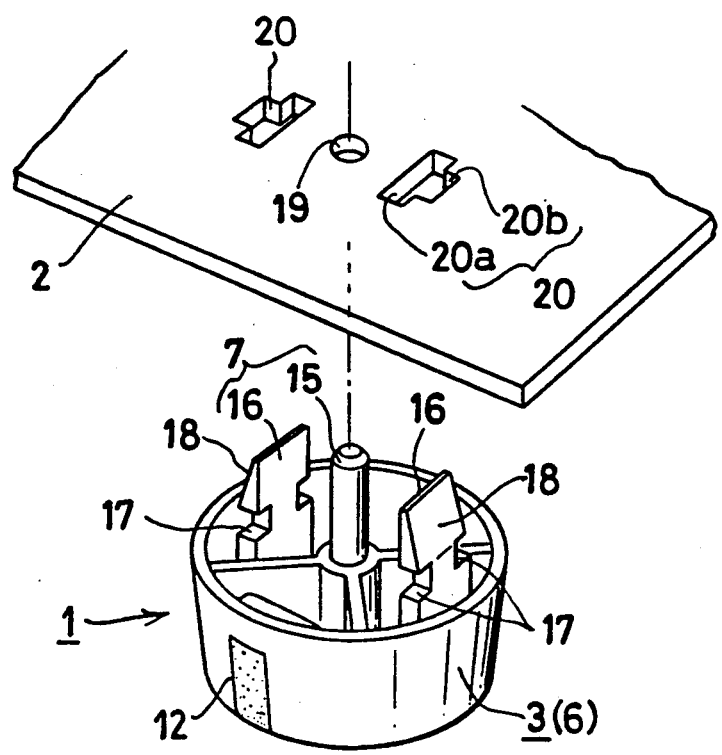
FIG. 2 is a perspective view showing the manner of mounting the plastic leg shown in FIG. 1 upon an appliance panel.
Figure 3:
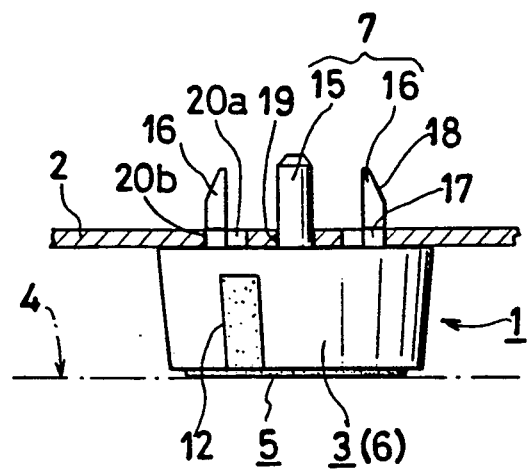
FIG. 3 is a side view showing the plastic leg shown in FIG. 1 mounted upon the appliance panel.

FIGS. 1 to 4 show a first embodiment of the double-shot molded resin article constructed according to the present invention. This embodiment is a plastic leg which is mounted upon the bottom of an electrical appliance or an article of furniture. The plastic leg, generally designated at 1 as shown in FIGS. 2 and 3, comprises a primary molding part 3 consisting of a hard resin mounted upon a bottom panel 2 of the appliance and a secondary molding part 5 consisting of a soft resin, projecting downwardly from the lower end of the primary molding part 3 and in contact with a support surface 4.

The primary molding part 3 is molded from a comparatively hard thermoplastic resin, such as, for example, polypropyrene having a melting point of approximately 165° C. degrees. The primary molding part 3, as shown in FIGS. 2 and 3, has a substantially conical, hollow frame-like body portion 6 having a predetermined height and a mounting leg portion 7 integrally extending from the body portion 6 for mounting the plastic leg 1 by means of a one-touch operation upon the bottom panel 2 of the appliance.

Figure 4:
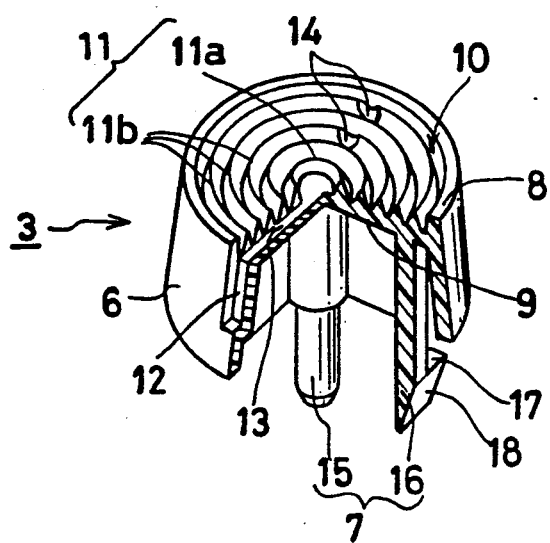
FIG. 4 is a perspective view, partly broken away, showing a primary molding part of the plastic leg shown in FIG. 1.

The body portion 6, as shown in FIG. 4, has an annular projection 8 constituting the edge of the lower end of the leg. The annular projection 8 defines a circular recess 10 which is closed at the top by means of a bottom wall 9 and open at the bottom. A raised portion 11 projects downwardly from the lower surface of the bottom wall 9 into the recess 10.

The raised portion 11 consists of a central raised portion 11a having a height slightly smaller than that of the annular projection 8 and having a sharp conical sectional profile and four annular raised portions 11b concentrically surrounding the central raised portion 11a substantially at a uniform radial interval and having a sharp triangular sectional profile.

The, annular projection 8 is formed with a notch defined within a lower end portion thereof and serving as a gate 12, through which molten resin is supplied for forming the secondary molding part 5. A, resin guide groove, 13 is formed such that it extends radially inwardly from the gate 12. The groove 13 has the same width as the gate 12, and it extends across the stems of the individual annular raised portions 11b. Portions of the raised portions 11b opposite the resin guide groove 13 are each formed with a gas purging hole 14 vertically penetrating the bottom wall 9.

The mounting leg portion 7, as shown in FIGS. 2 and 4, consists of a guide pin 15 extending substantially from the center of the bottom wall 9 and having a tapered, free end and a pair of leg portions 16 extending parallel to and upon opposite sides of and to a slightly less extent than the guide pin 15, each portion 16 having a longitudinally elongate rectangular plate-like shape. Each leg portion 16 has a longitudinally intermediate portion formed with a pair of notches 17 defined within the opposite sides thereof. The lower edges the notches 17 coincide in level with the upper end of the body portion 6. The vertical dimension of the notches substantially coincides with the thickness of the bottom panel 2 of the appliance. A free end portion of each leg portion, 16 has a tapered outer surface 18 which extends upwardly in an inclined or oblique manner so that its thickness is progressively reduced toward the free end thereof.

The secondary molding part 5 is molded from a thermoplastic resin having a melting point higher, preferably at least by 70° C., than the melting point of the primary molding part, such as, for example an elastomer having a melting point of approximately 270° C. It fills the overall space of the recess 10 of the body portion 6 of the primary molding part 3 and projects slightly downwardly beneath the lower end of the annular projection 8 of the body portion 6. In particular it has a circular, horizontal and flat lower surface (FIGS. 1 and 3).

The molding procedure will now be described. First, an injection molding die (not shown) for forming the primary molding part 3 is prepared, and molten resin is poured into the die so as to form the primary molding part 3.

Then, a die (not shown) for forming the secondary molding part 5 by means of injection molding is held open, and the primary molding part 3 formed in advance is disposed within the secondary die. Then, the secondary die is closed and a different molten resin is poured into the secondary die.

The poured secondary molten resin enters the recess 10 from the gate 12 of the primary molding part 3 and proceeds through the guide groove 13 so as to fill the spaces between the central raised portion 11a and the innermost annular raised portion 11b, between adjacent annular raised portions 11b and between the outermost annular raised portion 11b and the inner surface of the annular projection 8. At this time, the surfaces of the central and annular raised portions 11a and 11b and the inner surface of the annular projection 8 of the primary molding part 3 are fused by means of the heat of the poured molten resin because the melting point of the resin for forming the secondary molding part 5 is higher than that of the resin for forming the primary molding part 3. Thus, when the molten surface becomes hard again, the primary and secondary molding parts 3 and 5 are bonded together (FIG. 1).

It is particularly noted that since the central and annular raised portions 11a and 11b have a sharp triangular sectional profile, their heat conductivity is high, so that a pronounced fusing effect can be obtained. Furthermore, the central and annular raised portions 11a and 11b provide an extremely increased fusion-bonding area so as to provide for a strong bonding force between the two molding parts 3 and 5.

The secondary molten resin is also charged into the gas-purging holes 14 of the primary molding part 3. However, the holes 14 serve only for gas purging, and they are adapted such that the charged molten resin will not proceed through these holes 14 to the upper surface of the bottom wall 9.

The plastic leg 1 formed in the above way manner is mounted upon an appliance in the following way. First, the bottom panel 2 of the appliance is formed of positions corresponding to the central guide pin 15 and leg portions 16 of the plastic leg 1 with a circular through hole 19 and substantially T-shaped through holes 20, respectively, such that the guide pin 15 and leg portions 16 can be inserted through these holes. The T-shaped through holes 20 are spaced, apart a distance slightly less than the distance defined between the leg portions 16, and they each have a wide rectangular first portion 20a, through which the associated leg portion 16 can proceed in a slightly inwardly flexed state, and a rectangular second portion 20b, narrower than and communicating with the first portion 20a and capable of receiving the portion of the leg portion 16, defined between the opposite side notches 17.

In order to mount the plastic leg 1 within panel 2, it is strongly pushed against the bottom panel 2 with the guide pin 15 and leg portions 16 aligned with the through holes 19 and 20.

As a result, the tapered outer surface of the free end portion of each leg portion 16 engages with the outer edge of the first portion 20a of each T-shaped through hole 20. As the plastic leg is strongly pushed toward the bottom panel 2, the end portions of the two leg portions 16 are displaced toward each other by means of the engagement of the tapered outer surfaces 18 with the outer edge portions of the hole regions 20a. When the plastic leg 1 is inserted until the upper end of the body portion 6 strikes the lower surface of the bottom panel 2, the leg portions 16 flex away from each other as a result of their elastic restoring force so as to be restored to their initial state. At this time, each leg portion 16 is displaced from the first hole portion 20a to the second portion 20b of each T-shaped through hole 20. The portion of the leg portion 16 defined between the opposite side notches 17 is thus disposed within the second portion 20b of the hole 20. The leg portions 16 thus can no longer be moved downwardly. In this way, the plastic leg 1 is secured to the lower surface of the bottom panel 2 of the appliance (FIG. 3).

FIGS. 5 to 8 show a plastic leg 1 comprising a second embodiment of a double-shot molded resin article constructed in accordance with the present invention. This plastic leg 1, like that of the first embodiment, comprises primary and secondary molding parts 3 and 5, which are molded from the same materials as in the first embodiment.

Figure 6:
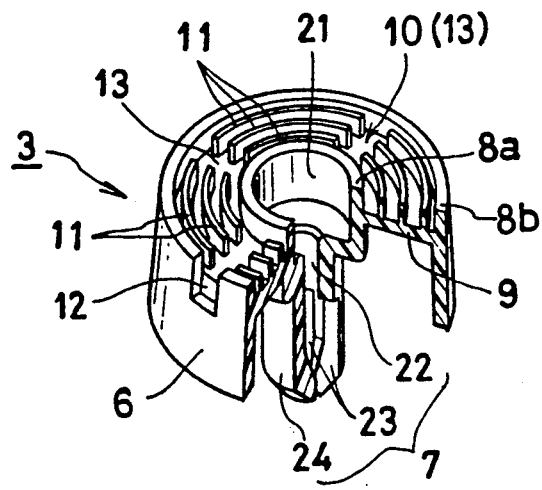
FIG. 6 is a perspective view, partly broken away, showing a primary molding part of the plastic leg shown in FIG. 5.
Figure 7:
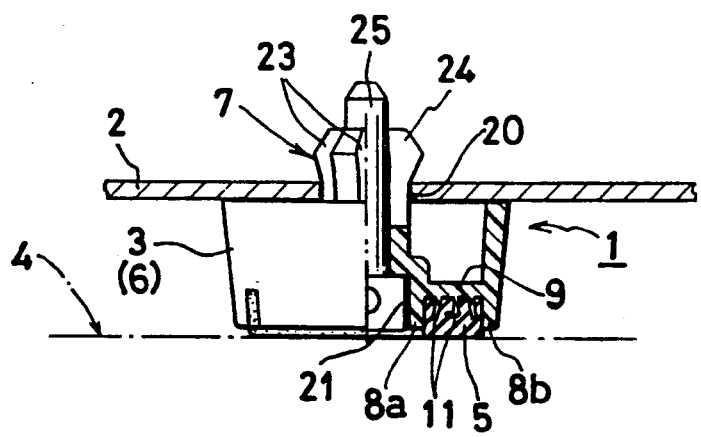
FIG. 7 is a sectional view showing the plastic leg shown in FIG. 5 mounted upon a base panel.

The primary molding part 3, as shown in FIGS. 6 and 7, has a body portion 6 and a leg portion 7. The body portion 6, as shown in FIG. 6, has a vertically penetrating central bore 21. At its lower end, it has an inner annular projection 8a defining the lower end of the bore 21 and an outer annular projection 8b substantially flush with the inner annular projection 8a and defining its outer periphery. The two annular projections 8a and 8b define an annular recess 10 therebetween, which is closed at the top by means of a bottom wall 9 and open at the bottom. A raised portion 11 extends downwardly from the lower surface of the bottom wall 9 into the recess 10.

The raised portion 11 consists of three concentric annular raised portions formed at a uniform radial interval between the annular projections 8a and 8b, and they have a predetermined height or depth which is slightly less than that of the annular projections 8a and 8b. Each annular raised portion 11 has a rectangular sectional profile with a smaller thickness than that of the annular projections 8a and 8b. The body portion 6 has a gate 12 and also has four resin guide grooves 13 communicating with the gate 12 and extending radially so as to cross stem portions of the annular raised portions 11. The guide grooves 13 have the same width as the gate 12.

The leg portion 7, as shown in FIGS. 6 and 7, has a hollow portion 22 communicating with the bore 21 of the body portion 6. The inner diameter of the hollow portion 22 decreases toward the free end. The free end portion of the hollow portion 22 has four circumferentially spaced-apart axial slits 23 extending from its free or upper end and dividing it in the form of a cross into four equal divisions 24.

The two molding parts 3 and 5 are formed in the same manner as in the first embodiment.

Figure 5:
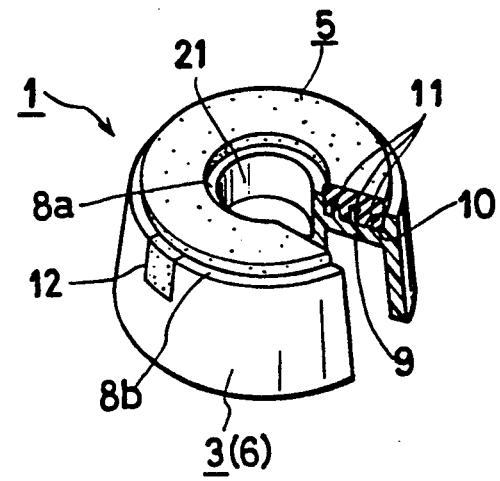
FIG. 5 is a perspective view partly broken away, showing a plastic leg constructed in accordance with a different embodiment of the invention.
Figure 8:
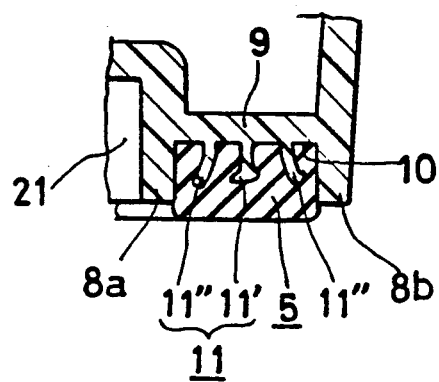
FIG. 8 is a fragmentary sectional view, upon an enlarged scale, showing the plastic leg shown in FIG. 5.

More specifically, at the time of the secondary molding, the molten resin enters the recess 10 through means of the gate 12 of the primary molding part 3 and proceeds through means of the guide grooves 13 extending across the annular raised portions 11 so as to fill the spaces between the outer surface of the inner annular projection 8a and the innermost annular raised portion 11, between adjacent annular raised portions 11 and between the outermost annular raised portion 11 and the inner surface of the outer annular projection 8b. At this time, the outer surface of the inner annular projection 8a, annular raised portions 11 and inner surface of the outer annular projection 8b of the primary molding part 3 are fused, by means of the heat of the poured molten resin for the secondary molding part 5, with the secondary molding part resin since the melting point of the resin forming the secondary molding part 5 is higher than the melting point of the resin forming the primary molding part 3. When the fused portions become hard again, the primary and secondary molding parts 3 and 5 are bonded together (FIGS. 5 and 8).

More particularly, since the annular raised portions 11 have a rectangular sectional profile having a small thickness, high heat conductivity can be, obtained so as to obtain a pronounced fusing effect. Furthermore, the annular raised portions 11 provide a greatly increased fusion-bonding area which ensures firm bonding between the two molding parts 3 and 5.

Furthermore, when exposed to the heat of the poured secondary molten resin, the free end portions of the annular raised portions 11 tend to be fused and plastically deformed into a mushroom shape. The mushroom-like deformed portions 11' can act as an anchor, so that the two molding parts 3 and 5 become more difficult to separate from each other (FIG. 8).

Furthermore, in addition to the heat of the poured secondary molten resin, the extrusion pressure pressurizes the poured secondary molten resin to engaging the annular raised portions 11, so that the annular raised portions 11 tend to be plastically deformed into inclined states. The inclined deformed portions 11" extend obliquely with respect to the direction of separation of the secondary molding part 5 with respect to primary molding part 3, that is the direction toward the opening of the recess 10 of the primary molding part 3, and this adds to the difficulty of separation of the two molding parts 3 and 5 from each other.

Meanwhile, within the recess 10 of the primary molding part 3 the poured secondary molten resin flows through narrow flow passages defined between the outer surface of the inner annular projection 8a and the innermost annular raised portion 11, between adjacent annular raised portions 11 and between the outermost annular raised portion 11 and the inner surface of the outer annular projection 8b and thus encounters high resistance against flow. Therefore, the annular raised portions 11 tend to be deformed by such additional forces of pressure. Furthermore, since the overall flow passage comprises the guide grooves 13 extending in four different radial directions and the narrow circumferential passages, defined by means of the annular raised portions 11 and annular projections 8a and 8b, it is like a labyrinth, and the molten resin flows irregularly, so that the resistance against flow is increased still further.

The mounting of the plastic leg 1 will now be described. First, the bottom panel 2 of the appliance is formed with a vertically penetrating circular through hole 20 having substantially the same diameter as the outer periphery of the leg portion 7.

Then, the leg portion 7 of the plastic leg 1 is inserted upwardly through means of the through hole 20. Then, a pin 25 is inserted into the hollow portion 22 of the leg portion 7 through means of the bore 21 of the body portion 6.

Since the inner diameter of the hollow portion 22 decreases toward the upper end, upon insertion of the pin 25 the divisions 24 of the hollow portion 22 defined by means of the slits 23 engage the outer periphery of the advancing pin 25. As a result, the hollow portion 22 is expanded radially outwardly with respect to the back side of the, bottom panel 2 so that it can no longer be moved downwardly and detached from the hole 20. In this way, the plastic leg 1 is secured to the underside of the bottom panel 2 of the appliance (FIG. 7).

Figure 9:
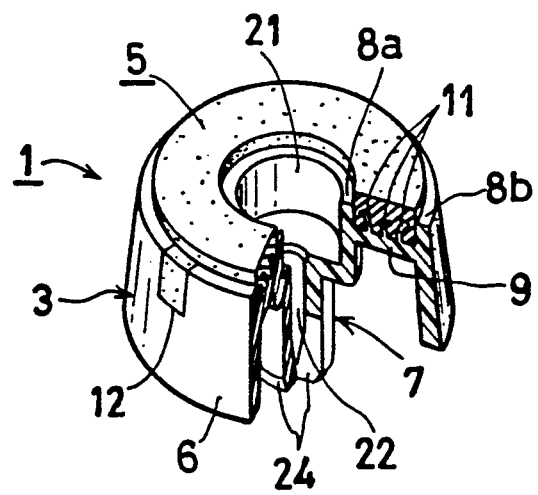
FIG. 9 is a perspective view, broken away, showing a plastic leg constructed in accordance with a further embodiment of the present invention.
Figure 10:
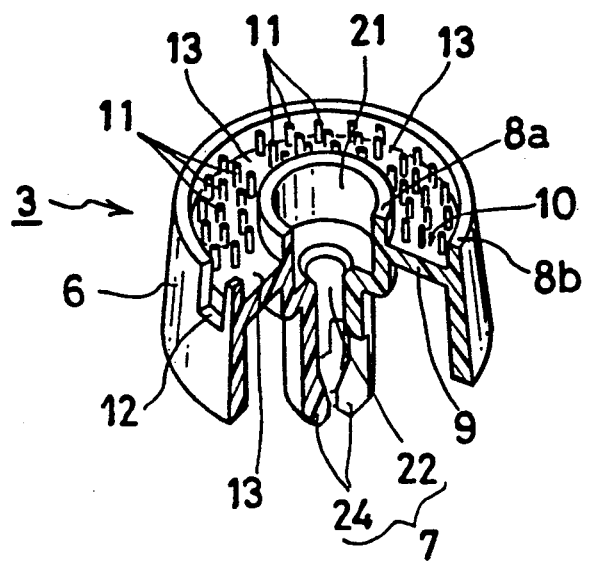
FIG. 10 is a perspective view, partly broken away, showing a primary molding part of the plastic leg shown in FIG. 9.

FIGS. 9 and 10 show a further embodiment of the invention. In this instance, the raised portion 11 consists of a large number of thin pin-like portions extending from the bottom wall 9. With this embodiment, end portions of the pin-like portions are readily plastically deformed into a mushroom-like or obliquely inclined form by means the heat of the poured secondary molten resin and the extrusion pressure thereof. More particularly, since the raised portion is thin and pin-like, deformation into a mushroom-like form tends to be obtained (FIG. 10).

As has been described in the foregoing, according to the invention, at the time of the secondary molding the raised portion formed by means at the time of the primary molding is fused by means of the heat of the poured secondary molten resin, whereby the secondary molding part is fusion-bonded to the primary molding part. Thus, the die for the secondary molding process may have a simple configuration and readily permits manufacture of a double-shot molded resin article upon a mass production scale.

Obviously, many modifications and variations of the present invention are possible in light of the above teachings. It is therefore to be under stood that within the scope of the appended claims, the present invention may be practiced otherwise than as specifically described herein.

What is claimed is:

1. A double-shot molded resin support leg for supporting an object under axial load conditions upon a support surface, comprising:

a primary molding part obtained by firstly molding said primary molding pat from a first predetermined thermoplastic resin having a first predetermined melting point;

a secondary molding part obtained by subsequently molding said secondary molding part upon said primacy molding pat from a second predetermined thermoplastic resin which is different from said first primary molding part thermoplastic resin;

said secondary molding part thermoplastic resin having a second melting point which is higher than said first predetermined melting point of said primary molding part thermoplastic resin; and said primary molding part has a plurality of accurate concentric, annularly arranged raised portions, constituting a junction surface means for engagement with said secondary molding part by fusion-bonding as a result of said raised potions of said primary molding part being partially melted by means of said secondary molding part thermoplastic resin having said second melting point higher tan said first melting point of said primary molding part thermoplastic resin when said secondary molding pat is formed upon said primary molding part, whereby as a result of said disposition and provision of said plurality of accurate, concentric, annularly arranged raised portions, said primary and secondary molding parts are effectively bonded together and will not separate from each other even when lateral loads are impressed upon said support leg in any radial direction when said object supported by said support leg is moved upon said support surface from one location to another.

2. The double-shot molded resin support leg according to claim 1, wherein said raised portions extend in a direction perpendicular to the direction of injection of said secondary molding thermoplastic resin.

3. The double-shot molded resin support leg according to claim 1, wherein said raised portions have a sharp triangular sectional profile.

4. The double-shot molded resin support leg according to claim 1, wherein said raised portions have a rectangular sectional profile having a small thickness.

5. The double-shot molded resin support leg according to claim 1, wherein said raised portions consist of a plurality of raised portions spaced apart at intervals constituting passages of said secondary molding thermoplastic resin.

6. The double-shot molded resin support leg as set forth in claim 1, wherein:

said support leg comprises a support leg for an appliance.

7. The double-shot molded resin support leg as set froth in claim 1, wherein:

said support leg comprises a support leg for an article of furniture.

8. The double-shot molded resin support leg as set forth in claim 1, wherein:

said primary molding part thermoplastic resin comprises polypropyrene.

9. The double-shot molded resin support leg as set forth in claim 8, wherein:

said predetermined melting point of said primary molding part thermoplastic resin is 165° C.

10. The double-shot molded resin support leg as set forth in claim 1, wherein:

said predetermined melting point of said secondary molding pat thermoplastic resin is 270° C.

11. A molded resin support leg as set forth in claim 1, further comprising:

gas-purging holes defined within said plurality of annularly arranged raised portions for purging gas during molding of said secondary molding part.

12. A molded resin support leg as set forth in claim 1, further comprising:

molten resin guide grooves radially defined within said primary molding part for guiding molten thermoplastic resin material comprising said secondary molding part into spaces defined between said plurality of raised portions of said primary molding part.

13. A molded resin support leg as set forth in claim 12 wherein:

said primary molding part comprises four, equiangularly spaced molten resin guide grooves.

* * * * *